United States Patent
Reisinger et al.

(10) Patent No.: US 6,820,066 B1
(45) Date of Patent: Nov. 16, 2004

(54) ARRANGEMENT AND METHOD FOR STORING DATA RELATING TO THE USAGE OF A TERMINAL DEVICE

(75) Inventors: Frank Reisinger, Oranienburg (DE); Olaf Turner, Berlin (DE)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 0 days.

(21) Appl. No.: 09/410,522

(22) Filed: Oct. 1, 1999

(30) Foreign Application Priority Data

Oct. 9, 1998 (DE) .......................................... 198 47 947

(51) Int. Cl.$^7$ .............................................. G06F 17/60
(52) U.S. Cl. ..................... 705/410; 705/30; 705/401; 705/404
(58) Field of Search ...................... 705/30, 401, 404, 705/410

(56) References Cited

U.S. PATENT DOCUMENTS

| | | | |
|---|---|---|---|
| 4,442,501 A | | 4/1984 | Eckert, Jr. et al. |
| 4,447,872 A | * | 5/1984 | Nothaft ..................... 364/200 |
| 4,812,965 A | | 3/1989 | Taylor |
| 4,931,943 A | | 6/1990 | Vermesse |
| 5,309,363 A | | 5/1994 | Graves et al. |
| 5,444,631 A | * | 8/1995 | Vermesse ............... 364/464.02 |
| 5,490,077 A | * | 2/1996 | Freytag ................. 364/464.02 |
| 5,592,576 A | * | 1/1997 | Hayashi ..................... 382/318 |
| 5,680,463 A | | 10/1997 | Windel et al. |
| 5,710,706 A | | 1/1998 | Märkl et al. |
| 5,715,164 A | * | 2/1998 | Lietchi et al. ........... 364/464.2 |
| 5,790,768 A | | 8/1998 | Windel et al. |
| 5,805,711 A | | 9/1998 | Windel et al. |
| 5,822,618 A | * | 10/1998 | Ecclesine ..................... 395/877 |
| 6,148,292 A | * | 11/2000 | Reisinger et al. ............. 705/30 |
| 6,153,835 A | * | 11/2000 | Schwartz et al. ........ 177/25.13 |

FOREIGN PATENT DOCUMENTS

| | | |
|---|---|---|
| DE | OS 197 31 304 | 7/1997 |
| EP | 0 285 956 | 3/1988 |
| EP | 0 493 948 | 12/1991 |
| EP | 0 516 403 | 5/1992 |
| EP | 0 717 376 | 11/1995 |
| FR | 2 665 003 | 7/1990 |

OTHER PUBLICATIONS

"Hays DX Recognises Post Monitoring System", Lawyer, p. 3, Sep. 20, 1999.*

* cited by examiner

*Primary Examiner*—Susanna Meinecke-Diaz
*Assistant Examiner*—J. Stimpak
(74) *Attorney, Agent, or Firm*—Schiff Hardin LLP

(57) ABSTRACT

In an arrangement and method for storing data about usage of a terminal device, a statistical memory is provided for the usage data, which are stored in statistical classes. A processor is connected to the statistical memory and a program memory and is programmed for automatic class formation, and for statistical storage of the usage data and appertaining storage of the count of a counter which is incremented upon each entry or occurrence of an item of the class.

4 Claims, 4 Drawing Sheets

| COM Code (CC) | FOR PARAMETERS OF THE CLASS OF MAIL $COM_m$ | | | | | | |
|---|---|---|---|---|---|---|---|
| | PIECE | POSTAGE | DATE | SLOGAN | WEIGHT | FORMAT | PRINT SELECT. |
| | 1 | 1,10 | 30.09.98 | 3 | GW1 | C4 | EXPRESS |
Fig. 3
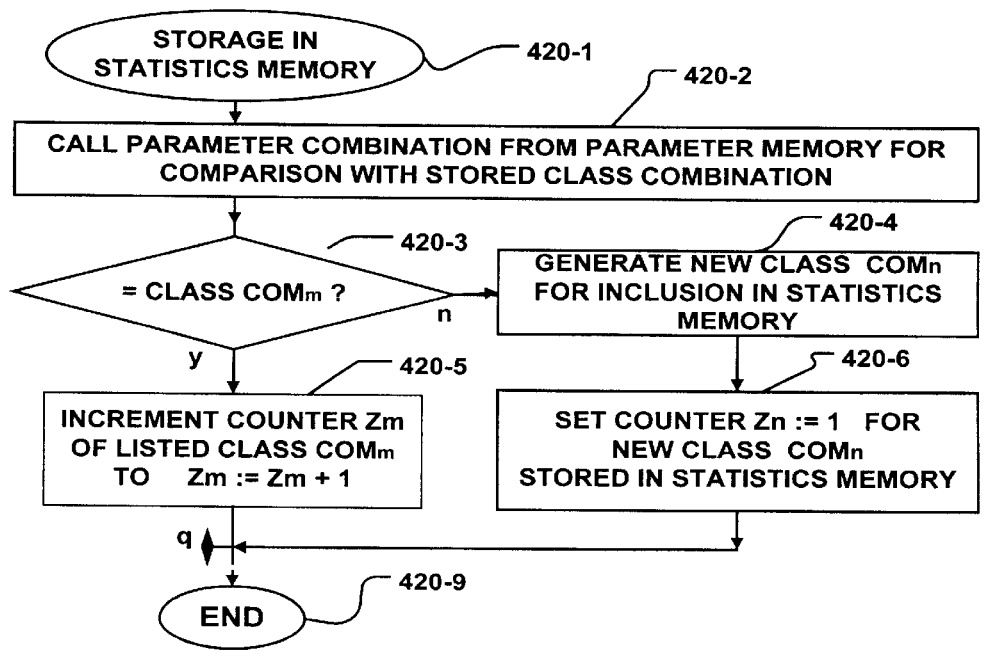
Fig. 4
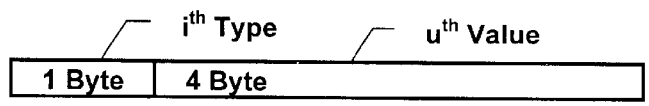
Fig. 5

ARRANGEMENT AND METHOD FOR STORING DATA RELATING TO THE USAGE OF A TERMINAL DEVICE

BACKGROUND OF THE INVENTION

1. Field of the Invention

The present invention relates to an arrangement and a method for storing data relating to the usage of a terminal device, particularly an arrangement and the method suitable for users of postage meter machines.

2. Description of the Prior Art

Newer postage meter machines manufactured by Francotyp-Postalia AG & Co. make use of digitally functioning printing units. For example, the postage meter machines T1000 and JetMail, which are produced by Francotyp Postalia AG & Co. worldwide, include a thermotransfer printer and an ink jet printer, respectively. These basically make it possible to print addresses and other information which is associated with a shipping service on a filled envelope in the region of the postage franking stamp. Selected imprints identifying the type or form of shipment are thus printed in the franking process.

European Patent 493 948 discloses a postage meter machine which can print the type of shipment as a selected imprint stamp separate from the franking stamp imprint or integrated therewith. This device is equipped with a number of registers in a secured module for storing accounting data related to the use of the postage meter machine for franking items. A first set of registers relates to a specific first service, and a second set of registers relates to a specific second service, and one of these specific services can be selected via the input means and the accounting data of the selected service are updated. Only certain services are registered, however, these being for the purpose of generating an invoice or other type of documentation for billing for the use of the device. These services do not give the carrier sufficient information about customer behavior.

Several postal authorities/mail carriers require, or promote by cost rebates, the making of printouts by the user relating to operating sequences stored in the postage meter machine, for the documentation or bill of lading accompanying a mail batch or freight delivery, as well as to provide such information over a time period. That is, there is no need to prepare accounts, statistics or receipts related to a successful reloading for purposes of recrediting. Future mail carriers who will offer new mail delivery services would also have in interest in predicting customer behavior, as these services will have to be billed separately.

According to European Patent 285 956, a postage meter machine is equipped with a specific operating sequence storage and with a terminal for an external printer. It is required of the user to search out and print specific data from the stored, periodic collection of all data. To this end, the user must not only ready a separate printer, but may also have to set aside an extensive time outlay for searching and printing. It is additionally required on the part of the postage meter machine manufacturer to make available sufficient storage space in the postage meter machine for this purpose, so that it is possible to perform a recording with respect to the current count of a counter at suitable time intervals.

The form of storage can also be adapted to the needs of a variety of users of the same postage meter machine. Thus, some postage meter machines operate based on a classification in the form of cost centers which are allocated to individual user groups. In the T1000 postage meter machine, this acquisition is limited to ten cost centers. A method and arrangement for an internal cost center printout is described in German OS 42 24 955 for printing out corresponding reports without a separate external printer., i.e., using the printhead of the postage meter machine. The printouts that can be generated for each cost center contain listings of the postal use of the postage meter machine, and these lists can be subdivided by selected imprint. Avoidance of the need for an additional printer is advantageous to the user, but it is unreasonable to expect the user to repeatedly print out new lists with data relating to the use of the postage meter machine at the request of the courier or the data center. During the printout of lists of the cost center data, franking obviously cannot be performed using the internal printing heads of the postage meter machine.

French Patent 2 665 003 teaches a means for tracking the postal use of an electronic postage meter system that is in connection with a carrier-operated center and exchanges electronic messages therewith. Besides the message bytes, the communication format comprises information related to meter/user identification, register status, and credit status, as well as a number of additional bytes related to a statistical sequence breakdown of use. The bytes for the statistical breakdown are arranged according to postage values, to weights, or to destinations of franked items. A part of the instructions for the statistical breakdown can by modified during the communication with the center. The modification of an instruction must occur, however, before a statistical compilation is started. The communication occurs by telephone line or by an electronic module which needs to be physically transported to the communication partner. It is difficult for the data center to ascertain customer behavior, since, according to the specifications given in the instructions, only certain data are stored. Due to the variety of services, it is not always clear for which of the services the provider's capacity must be upgraded. Moreover, outmoded telecommunication systems do not permit a high data throughput. German OS 197 31 304 (corresponding to co-pending U.S. application Ser. No. 09/115,048 filed Jul. 14, 1998) discloses generating selectable linking instructions for the purpose of class formation in the data center, and transferring them to the postage meter machine in the form of new statistics instruction data. The formation of a new statistical mode occurs in the potage meter machine on the basis of the new statistics instruction data and chronologically before the use of functions and services and their statistical acquisition in the memory of the postage meter machine. An advantage is the low demand for storage space due to a pre-compressing of the data which can be achieved by the linkage. It is also advantageous that a transmission of pre-compressed data to the data center does not significantly interfere with franking usage (service mode) since this transmission only requires a small amount of time. From this data pre-compression, much can be learned about specific user behavior, but little about basic user behavior. Otherwise, the statistical compilation would have to be conducted rather extensively, which causes a higher demand for storage space. It is thus still necessary to set certain limitations. European Application 717 376 discloses a postage meter machine with a statistical program, with the transmission of statistical data to the data center by modem taking place and wherein parameters in the postage meter machine for the statistical data acquisition are modifiable by downloading new parameters from the data center for defining the statistical class boundaries. The possibilities for carrying out a statistical analysis are limited to postage value classes, however.

SUMMARY OF THE INVENTION

An object of the present invention is to provide a method and arrangement for optimal storage of data in a terminal device and rapid communication to a remote data center, wherein the statistical acquisition is able to achieve a maximum extent, so that instructions from the data center for storage can be omitted.

It is a further object to make usage of the terminal device in a service mode possible without the interference by the storage and transmission of usage data.

The above object is achieved in accordance with the principles of the present invention in a method and an arrangement for storing data relating to usage of a terminal device, wherein the terminal device includes a microprocessor and a memory, and wherein the terminal device also includes a statistical memory for storing usage data in statistical classes, the microprocessor being connected to the statistical memory as well as to a program memory, and wherein the microprocessor is programmed to automatically transmit data to a remote data center when the statistical memory is full.

The above object is also achieved in a method and an arrangement for storing data relating to usage of a terminal device, wherein the terminal device includes a memory and microprocessor, and wherein the terminal device includes a statistical memory for storing the usage data in statistical classes, and wherein the microprocessor is connected to the statistical memory and to a program memory, the microprocessor being programmed for automatically forming classes in the statistical memory by making entries in the statistical memory dependent on the count of a counter for each statistical class. By storing the statistical information in classes respectively represented by different counter counts, memory space is conserved.

Since there are no instructions from the data center for limiting the data storage, the terminal device has a program in the program memory for storing current use data with automatic class formation for the statistical acquisition and for transmitting them to a remote data center when the statistical memory is full.

The invention is based on the availability of economical storage units with a very high storage capacity, in order to statistically acquire usage data of a system. The usage data relate to information about characteristics of a system or features of a system device which are selected by the user. The mail handling the shipping of packages by a public or private mail carrier is only one possible type of service of a service operation. A "shipping system device" refers to a terminal which is remote from the service provider, or to a terminal device of a postage meter machine which is located at the customer. "Characteristics of the shipping system", or "characteristics of the shipping system device" refer to specific user inputs and specific automatically performed inputs associated with the request that a customer places with the service provider. For an efficient management of storage space occupied by usage data, the storage capacity of the statistical memory can be optimized, i.e. it can be made smaller than in known devices which store usage information merely in historical classes. Given the exhausting of the currently available storage capacity, the storage capacity can be increased; that is, the terminal or the device of a postage meter machine can be operated for a longer time before a communication with the data center is required. Shortly before or consequent to a memory overflow of the statistical memory, the stored data are loaded into a memory of the data center. Based on the enhanced capabilities of communication with a high baud rate, the communication requires relatively little time to transmit all data from the terminal device to the data center. Given the successful data transmission from the statistical memory to the remote memory of the data center, the original storage capacity can be reestablished by clearing the statistical memory.

In particular, the terminal device is a postage meter machine, a device of a franking and/or mail processing system, a PC postage meter or some kind of peripheral device of a system which itself performs a service, or permits the use of the service of a third party. A recording relating to individual events of the usage is created in a corresponding service mode. The user information preferably characterizes or flags the postal usage of the postage meter machine or of a franking system. The franking mode inventively includes a statistical mode with automatic class formation for storage of the current usage information. During operation, or as a result of operation in the franking mode, the postage metering machine judiciously stores usage information that corresponds to the current user behavior. A new class is automatically generated and a new record is stored if it is not possible to allocate the current usage information to an existing class. If a corresponding class for usage information has already been generated, to which the current usage information can be allocated, then an entry or occurrence counter which belongs to the class is merely incremented, and the new count number is stored in the existing record. The transmission of the data record to the data center occurs automatically in a timed manner or given an overflowing of the statistical memory.

The transmission occurs by modem and a data compression is performed in the transmission.

DESCRIPTION OF THE DRAWINGS

FIG. 3 is an illustration of an exemplary set of classes used in accordance with the invention.

FIG. 4 is a flowchart for the statistical storing with automatic class formation in accordance with the invention.

FIG. 5 is an illustration of a storage space for a parameter in accordance with the invention.

DESCRIPTION OF THE PREFERRED EMBODIMENTS

Figure 1A:
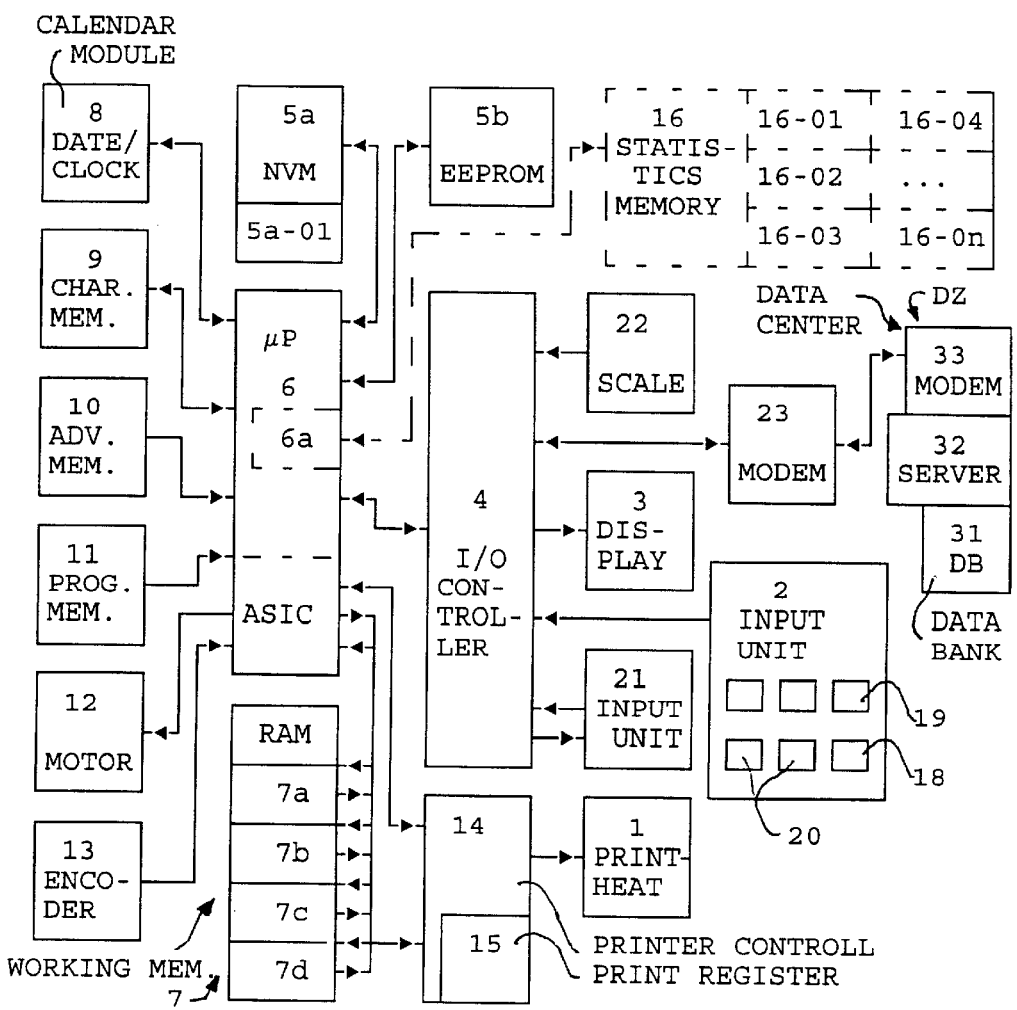
FIG. 1a is a block circuit diagram of a postage meter machine operable in accordance with the invention.

FIG. 1a is a block circuit diagram of an inventively equipped postage meter machine. The postage meter machine has a printhead 1 for a fully electronically generated franking image, at least one input unit 2 which having a number of actuating elements; a display unit 3; a modem 23 which establishes communication with a data center DZ;

an additional input unit 21 or a scale 22 which are coupled with a control unit 6 via an input/output controller 4; and non-volatile data memories 5a, 5b, and non-volatile memories 9 and 10 wherein characters and advertisements (slogans, clichés) are respectively stored, which encompass the variable and constant parts of the printout image, and a program memory 11.

German OS 19534530 gives a more detailed explanation of the individual functions of the postage meter machine. The character memory 9 supplies the necessary print data for the variable parts of the franking image to a volatile working memory 7. The control unit 6 is a microprocessor μP, which is in connection with the input/output control module 4, the character memory 9, the volatile working memory 7 (having memory means 7a–7d) and non-volatile working memories 5a, 5b (with internal statistical memory), or (as shown by dashed lines) with an additional statistical memory 16, the program memory 11, the motor 12 of a transport or forward feed device, possibly with a tape dispenser, an encoder (coding disk) 13, and with a calendar (clock/date) module 8. The microprocessor 6 communicates with the working memory 7, and with components in a machine base, via an ASIC (application specific integrated circuit). The components in the base include a printer control 14 which includes a print register 15, for operating the printhead 1.

The non-volatile working memory 5b can be an EEPROM, for example, which is secured against removal by at least one additional measure, such as cementing onto the circuit board, sealing or casting with epoxy resin. The current parameters are stored in the non-volatile memory 5a, in an area 5a-01 provided for this purpose, which are printed on the mail item as variable data. The illustration of a storage space for such a parameter memory 5a-01 is detailed in FIG. 5.

The data center DZ includes a modem 33, which communicates with the modem 23 via a communication path, and a server 32 connected to the modem 33 for routing transmitted information from the modem 33 to a data bank 31, serving as a remote memory.

For storing the statistical data, the current usage data are taken from the parameter memory and form a class of parameters, shown in detail later with reference to FIG. 3. The actual storage of the statistical data can be realized separately in a statistical memory 16 or likewise within the non-volatile memory 5a in which particular memory areas are made available. For a specific service which is made available by a different service provider, separate memory areas (not illustrated) for usage data or separate memory modules are provided. The ir dividual memories can be realized by several physically separate modules or combined into a few modules.

The usage data in question are preferably stored in at least one separate storage area encompassing a number of storage spaces 16-01 to 16-On. In the exemplary embodiment according to FIG. 1a, the memory module 16 is allocated to the service provider, and its memory area is allocated to all cost centers. Given a number of memory areas, it is possible for each memory area to be allocated to a cost center, respectively. Per storage space, it is possible for the microprocessor 6 to address a number of memory cells corresponding to the number of information units (bits) to be stored. The microprocessor 6 can contain an internal memory 6a for this purpose. Information such as the number, postage value, date, advertising slogan number, weight, format, selected imprints for shipping information (shape, type, destination) and other specific settings can be represented by these information units (bits).

Figure 1B:
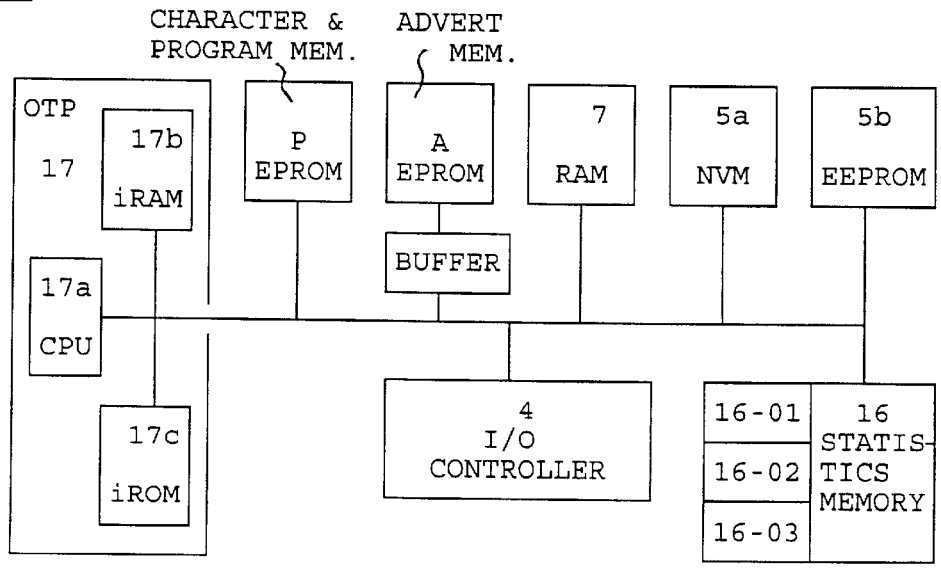
FIG. 1b shows variants with separate statistical memories and with OTP in the control unit of a terminal device operable in accordance with the invention.

FIG. 1b illustrates details of the block circuit diagram of another variant of a terminal device using a one-time programmable (OTP) processor 17 as the control unit. The block circuit diagram illustrated in FIG. 1b applies in principle to any arbitrary electronic control unit to which it is possible to connect a printer (not illustrated) and a modem (not shown). In accordance with the invention the electronic control unit makes available at least one separate memory area for usage data, which can be transmitted to the data center DZ by modem at time intervals. Alternatively, in a variant which is not illustrated here, an electronic postage meter machine can be realized as a personal computer with a conventional printer connected to it.

An arrangement such as this is also referred to as a PC postage meter machine.

The printer can alternatively be of a type for high-speed mail processing. German OS 19 711 998 (corresponding to co-pending U.S. application Ser. No. 09/028,498 filed Feb. 24, 1998) discloses a mail processing system whit a machine base station which prints and which is controlled via a personal computer.

A suitable OTP processor is already employed in an embodiment of a postage meter machine disclosed in European Application 716 398. It is connected to a non-volatile memory for billing and to an ASIC as an interface to a base. Details of this embodiment are described in German OS 195 34 530, as well as in German OS 197 31 304. The basic components of the version embodying an OTP processor 17 are shown in FIG. 1b. The OTP processor 17 contains a central processing unit 17a, and internal random access memory (iRAM) 17b, and an internal read only memory (iROM) 17c. These components of the OTP processor 17 are connected via a bus to a memory P-EPROM, which serves the purposes of both the character memory 9 and the program memory 11 from the embodiment of FIG. 1a. The OTP processor 17 is connected via a buffer to another memory A-EPROM, which serves as the advertising or slogan memory. The other components shown in the embodiment of FIG. 1b correspond to those already described in the embodiment shown in FIG. 1a.

In the following discussion, reference is made to the microprocessor 6, but it will be understood that the same functions and operation can be performed by the OTP processor 17, and therefore the discussion relating to the microprocessor 6 applies equally to the OTP processor 17.

Figure 2:
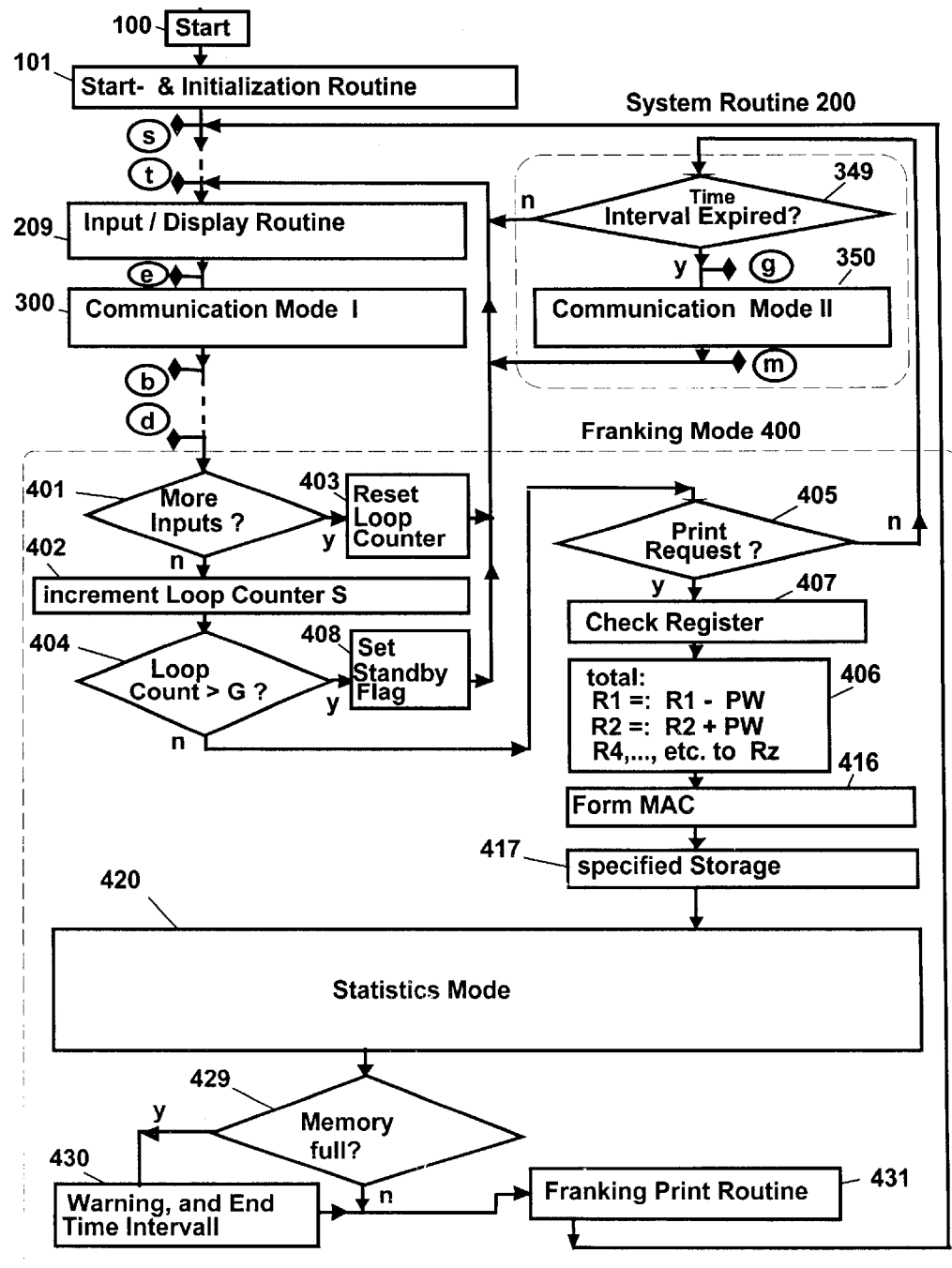
FIG. 2 shows an overall flowchart for a postage meter machine operable in accordance with the invention.

FIG. 2 depicts an overall flowchart for a postage meter machine with an inventive statistical mode 420 in a franking mode 400. Subsequent to activation of the postage meter machine in the step Start 100 within the start routine 101, a function test with subsequent initialization occurs. A program code in the internal memory 6a or iROM 17c allows several start security check routines, such as detailed in German OS 195 34 530. The program includes a system routine 200 with a point s following a start routine 101. The terminal device is a postage meter machine with a microprocessor 6, which is programmed to enter an input/display routine 209 and a franking mode 400 within a system routine 200, the input routine 209 including request steps for entering a usage information entry relating to at least one of the franking value, the weight, or the shipping, for the purpose of collecting current usage data in the parameter memory 5a-01 by means of the microprocessor of the postage meter machine.

The program continues after the input/display routine 209, with a branch to a communication mode 300 and the modified franking mode 400. German OS 197 31 304 details the step 209 for the input/display routine of characteristics of a system or features of the device, as well as the communication mode 300, the franking mode 400, and a statistical mode 420. The steps 401 to 407 can basically be processed in the modified franking mode 400 as described therein. The billing data are stored in the Li-battery-supported NV-RAM 5a in separate memory areas (not illustrated). There follow a number of steps, which are not illustrated, for forming a check sum and for DES encryption thereof resulting in the formation of an MAC (Message Authentification Code) in step 416. In step 417, the MAC is also stored under a cost center number in a carrier-specific manner as part of the billing data.

The inventive statistical mode, step 420, is called within the franking mode 400 by the OTP processor 17 or by the separate microprocessor 6 of the meter. The storage of the usage data occurs separately from the billing data. An arrangement of this type consists at least of one memory and one microprocessor, with the parameter memory 5a-01 for current usage data and a statistical memory 16 for a statistical storage of usage data being used, which are non-volatile memories. The compilation of current usage data is henceforth referred to as parameter combination. After a signal for a print request has been detected in step 405, and the steps 406 to 417 appertaining to the billing routine have been completed, it is determined by the microprocessor (step 420-1) that processing for the purpose of statistically storing the usage data in the statistical mode 420 can begin. The processor 6 or 17 is connected to a statistical memory 16 for a statistical storage of usage data, which are stored in statistical classes, and to the program memory 11, and it is programmed with a program for automatic class formation and for statistical storage of the usage data and appertaining storage of a count of a counter.

FIG. 4 depicts a flowchart for the statistical storage with the inventive automatic class formation. The following steps are executed therein:

Entry in step 420-1 into the statistical mode 420 for the statistical storage of usage data, Calling in step 420-2 of a current parameter combination from the parameter memory 5a-01 and execution of a comparison in step 420-3 as to whether a statistical class $COM_m$ of stored combinations that corresponds to this parameter combination already exists in the statistical memory 16, a count $Z_m$ of a counter being allocated to each stored combination, Increase in step 420-5 the count $Z_m$ of the counter in the statistical memory 16 by one if it is determined in step 420-3 that a statistical class according to the above cited combinations exists in the statistical memory 16, or automatic formation 4204 of a new statistical class $COM_m$ and storage thereof in the statistical memory 16, and (in step 420-6) setting of a count $Z_n$, which is allocated to the new statistical class $COM_n$, of a counter to a starting value (e.g. 1).

Optionally, it is checked subsequent to the end 420-9 whether there is still enough space in the statistical memory for usage data. If not, the microprocessor 6 (or the OTP processor 17) can automatically establish a connection to the data center in order to load the statistical data from the memory of the postage meter machine into the data bank DB of the data center DZ. Alternatively, the postage meter machine can wait for a user input in order to enter the communication mode 300.

In the above comparison in the statistical mode 420, the microprocessor 6 (or the OTP processor 17) evaluates all stored records. To each record it is possible to allocate a unique code, name or number identifying the record. This identification is stored in a first byte of the first storage space 16-01. In the second storage space 16-02, there exists at least one allocated number of memory cells as a counter for the purpose of storing a subsequent similar usage. The counter requires five bytes of memory cells in the second storage space 16-02. One byte is required for the type of each parameter, and an additional four bytes are needed for its value.

FIG. 3 depicts the representation of an $m^{th}$ class $COM_m$ of current parameters. A piece number is assigned to each class of parameter data. The data record stored in the statistical memory 16 consists of data for the postage value, date, advertising slogan number, weight, format, selected imprint, or other parameter data. Beyond this, the class can be marked with identifying data. In the extreme case, a data record consists only of an identifier CC (COM code) and data for the piece number, the type and the value of a parameter. This is the case either when parameters from the parameter memory could no longer be entered, or when additional parameters could not be taken into account.

FIG. 5 depicts the representation of a storage space in the parameter memory for such an extreme case. A first byte is provided for an identification character of the $i^{th}$ type for the types 1,2, . . . ,i, . . . ,k, and four bytes are provided for the $u^{th}$ value for the values 1,2, . . . ,u, . . . ,z. The parameter data which are correspondingly listed in storage spaces and remain non-volatilely stored until the next modification in the parameter memory 5a-01. It is, of course, also possible to construct this parameter memory 5a-01, which is formed in a memory area of the non-volatile memory 5a, as a separate parameter memory (as shown in FIG. 1b).

Figure 6:
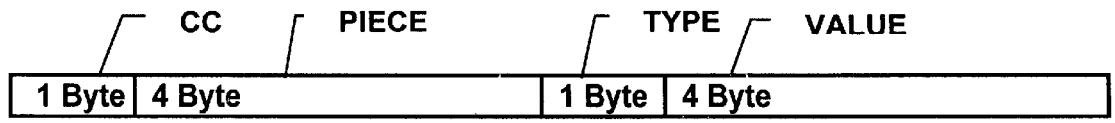
FIG. 6 is am illustration of a data record of the exemplary class shown in FIG. 3 with only one parameter, which record is stored in the statistical memory in accordance with the invention.

FIG. 6 is an illustration of a data record of the class $COM_m$ with only one parameter, which record is stored in the statistical memory 16. A first byte is provided for an identification character of the statistical class; four bytes are provided for the count of the counter; an additional byte is provided for the type of the first parameter; and four bytes are provided for the value of the first parameter. Such an extreme case is only illustrated in FIGS. 5 and 6 for simplicity. The bytes for the type and value of the additional parameters are simply appended to the end of the data record. This is possible, because the linkage forms a conjunction. The additional individual byte for the type of a second parameter and the additional four bytes for the value of the second parameter form the above described parameter combination at least with the byte for the type of the first parameter and with the four bytes for the value of the first parameter.

The available memory capacity in the statistical memory amounts to 20 kBytes, for example. It is used optimally by the space-efficient management of memory space. A statistical evaluation of the usage information pertaining to a service can occur periodically.

The use of the postage meter machine corresponding to the service of franking for the shipment of mail items yields at least one specific item of usage information. The usage information that is needed in order to create a statistical analysis in the data center is transmitted by the modem 23 to the data center DZ in the form of compressed data records. A memory area is selected dependent on a cost center that is entered by the user, so that, given a first usage "franking", at least the postage value is stored at one of the memory spaces in the statistical memory 16 as a first item of usage information. Storage spaces are not provided for values or numbers; rather, data records are stored in succession. A single item or a number of items of usage information can form a class. A counter is assigned to the class, this being incremented when the subsequent use yields the same class of usage information. When the subsequent use indicates a new use for which a class has not yet been formed, then a new class is automatically generated, and a corresponding data record is added in the statistical memory. The saving of storage space is a result of the piece counting given an identical usage of the postage meter machine in immediate succession and the storage of data records of variable length. The length is dependent on whether only one item of usage information or a number of different items are stored at the successive storage spaces.

FIG. 2 also illustrates optional steps, which follow the statistical mode 420, for checking the memory capacity of the statistical memory 16 that is still available. In each communication with the data center DZ, a time interval can be set so that the postage meter machine checks in at the data center DZ again after a period of time. In step 429, the memory space still available in the memory area of the usage memory 16 is checked. If the available storage space is still sufficient for storing a subsequent data record, then a jump to step 431 with the franking printing routine occurs. On the other hand, if the statistical memory is almost full, a jump to step 430 occurs, in order to generate a warning and to close the time interval for storing usage information, as warranted, before a jump to step 431 with the franking printing routine occurs. The franking printing routine is preferably executed by the microprocessor 6 or OTP processor 17 in known fashion. Since the microprocessor 6 or the OTP processor 17 in the system routine interrogates the print request 405 continuously and more rapidly than a mail item that is to be metered can be re-supplied, the execution of the interrogation step 349 is guaranteed. Thus, a communication with transmission of the data to the data center DZ and subsequent clearing of memory area(s) can be automatically triggered in an indirect manner. Alternatively, a wait for a user input may occur subsequent to the displaying process, in order to trigger a communication to the data center DZ. The microprocessor 6 (or the OTP processor 17) is programmed to enter a statistical mode 420 and a communication mode 300, or 350, whereby the microprocessor 6 or the OTP processor 17 is programmed to transmit data from the statistical memory 16 to a remote memory (data bank) 31 in the communication mode 300 or 350, the data transmission occurring in order to perform a statistical evaluation of the usage data remote from the terminal device. A calling of a routine for the statistical evaluation in the postage meter machine by user interface using the input unit 2,21 and with the display 3 is also possible.

The usage data stored in the statistical memory 16 of the terminal device are transmitted to the data center DZ shortly before or consequent to a memory overflow. The memory area can then be cleared for new usage data. Unlike the processing of billing data, the usage data may be deleted by the OTP processor 17 or by the microprocessor 6 of the meter subsequent to their transmission to the data center DZ. The microprocessor 6 and OTP processor 17 are programmed to restore the required memory capacity in the statistical memory 16 subsequent to the completion of the data transmission to the data bank 31.

Figure 7:
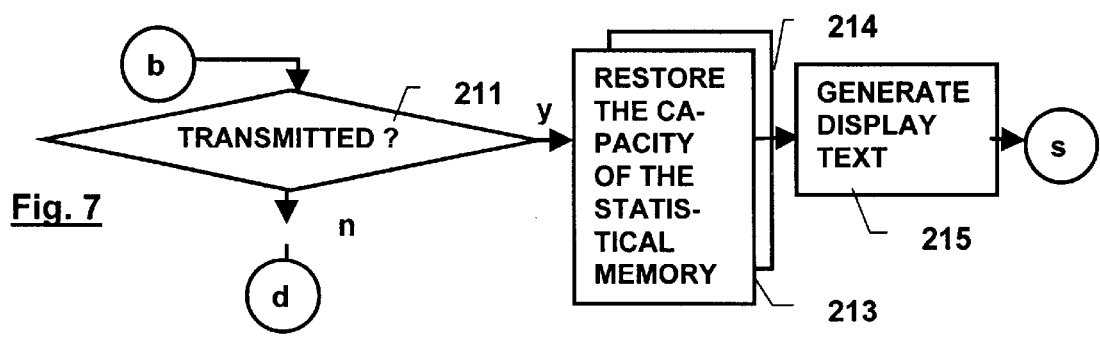
FIG. 7 shows a routine for restoring the storage capacity in accordance with the invention.

FIG. 7 depicts a routine for restoring the statistical storage capacity. Following the communication mode 300, point b has been attained (FIG. 2). Further inquiries may lie between points b and d of the flowchart illustrated in FIG. 2 before a service mode is attained, which encompasses the inventive statistical mode 420. Subsequent to the transmission and the storage of usage data in the remote memory, an interrogation step 211 of a system routine 200 of the terminal device detects whether the data have been transmitted to the data center DZ in the communication. If so, in step 213 the capacity of the statistical memory 16 can be restored, for instance by erasing. A display text is then generated in step 215, before a jump back to the point s of the system routine 200 occurs. Alternatively, a jump from the interrogation step 211 to a step 214 for evaluating the communication with partial or no clearing of the statistical memory 16 can occur.

Figure 8:
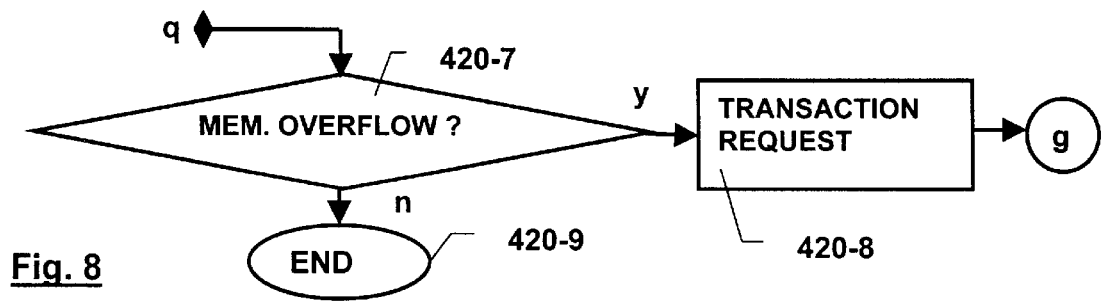
FIG. 8 is an illustration of a transaction request routine in accordance with the invention.

FIG. 8 depicts a transaction request routing in the case of a memory overflow. This is an optional subroutine to the statistical mode 420 (FIG. 4). The interrogation step 420-7 begins at point q, that is, after the processing of the steps 420-5 or 420-6 (depicted in FIG. 4). In the interrogation step 420-7, the memory overflow is determined. A jump to point g of FIG. 2 then occurs via the transaction request in step 420-8. Otherwise, the end 420-9 of the statistical mode is attained. If a statistical memory is already full, a jump from the statistical mode 420 directly to point g can occur, in order to automatically enter the communication mode 350.

In FIG. 2, the flowchart for storing usage data in the statistical mode (steps 417 to 430) was detailed, this being executed in the franking mode 400. The inventive method is not limited to this specific embodiment. A processing of usage data can in principle also occur subsequent to the completion of the franking printing routine or immediately following step 405 for detecting a print request.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for storing data representing usage of a terminal device, said data comprising a plurality of entries each having a parameter combination associated therewith, said method comprising the steps of:

storing a plurality of different parameter combinations in a parameter memory at a terminal device;

internally within said terminal device, organizing a statistical memory in said terminal device into a plurality of statistical classes respectively corresponding to said different parameter combinations;

allocating a plurality of counters respectively to said different parameter combinations, each counter having a count;

storing the respective counts of said plurality of counters in the statistical classes in the statistical memory respectively corresponding to said different parameter combinations;

comparing the parameter combination associated with an entry of said data representing usage to the different parameter combinations stored in said parameter memory and, if said parameter combination associated with said entry matches one of said different parameter combinations, incrementing the count stored in said statistical memory by one corresponding to said one of said different parameter combinations; and if no match of the parameter combination associated with said entry is found, re-organizing said statistical memory to include a new statistical class corresponding to the parameter combination of said entry, setting a count of a counter corresponding to said new statistical class to an initial value, and storing said initial value in said new statistical class in said statistical memory.

2. A method as claimed in claim 1 comprising the additional steps of:

after incrementing at least one count in said statistical memory, checking to determine whether said statistical memory contains sufficient storage capacity for storing an additional count corresponding to an additional entry; and if said statistical memory is full, automatically establishing a connection to a remote memory and transferring current contents of said statistical memory into said remote memory.

3. A method as claimed in claim 1 comprising the additional step of, upon an occurrence of an overflow of said statistical memory, transferring current contents of said statistical memory to a remote memory.

4. A method as claimed in claim 1 comprising the additional step of, after a predetermined time has elapsed, automatically transferring current contents of said statistical memory to a remote memory.

* * * * *